May 5, 1959

G. WALTHER, SR., ET AL 2,885,222

TRAILER COUPLER CONSTRUCTION

Filed Sept. 12, 1956

INVENTORS
GEORGE WALTHER, SR. &
WILLIAM WALTHER
BY Ely, Fryer Hamilton

ATTORNEYS

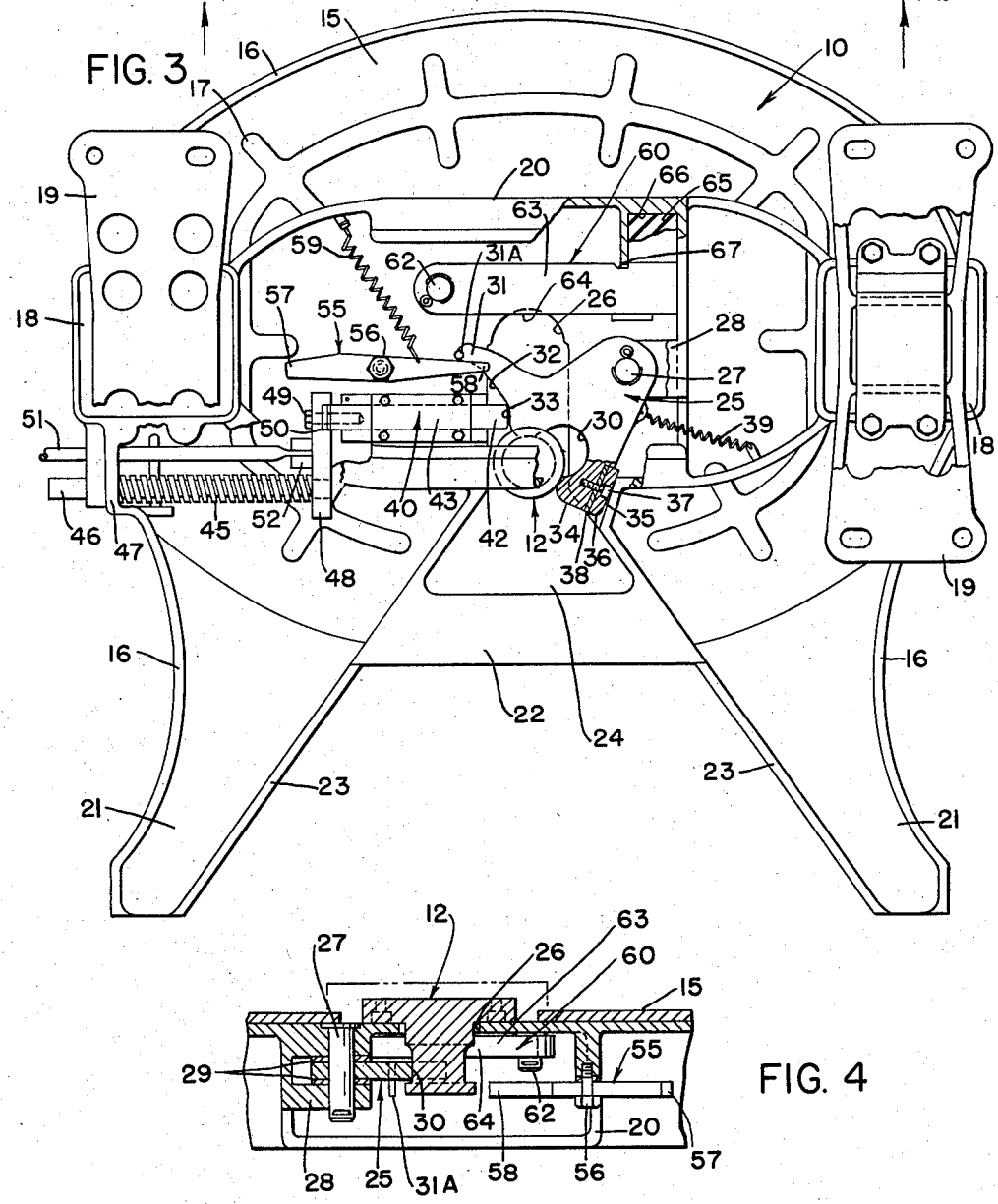
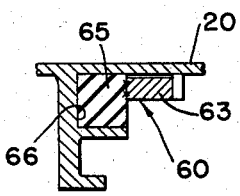

United States Patent Office 2,885,222
Patented May 5, 1959

2,885,222

TRAILER COUPLER CONSTRUCTION

George Walther, Sr., and William Walther, Dayton, Ohio, assignors to The Dayton Steel Foundry Company, Dayton, Ohio, a corporation of Ohio Application September 12, 1956, Serial No. 609,444

2 Claims. (Cl. 280—436)

The present invention relates generally to improvements in trailer coupler construction. More particularly, the invention relates to devices for coupling a tractor vehicle to a trailer such as are commonly referred to in the art as fifth wheels.

An object of the present invention is to provide an improved trailer coupler or fifth wheel which includes a rigid, one-piece member for engaging and holding the trailer king pin. In the past, many forms of king pin holding members, including hinged gripper bars, expansible jaws, sliding rods, etc., have been employed. However, none of these have been entirely satisfactory inasmuch as they lack inherent structural strength, require excessive repair and maintenance, and tend to become difficult to operate after prolonged periods of use.

Another object of the invention is to provide an improved locking mechanism which will positively engage and hold the king pin holding member in the locked position.

Still further, it is an object to provide an adjustable means on said holding arm for taking up the slack or compensating for wear of the holding arm and locking mechanism.

Still further, it is an object to provide a cooperative locking mechanism and latch means therefor which will reset for automatic recoupling after the king pin has been uncoupled.

Still further, it is an object to provide a member for absorbing the shock transmitted by the king pin during the coupling or recoupling operation.

These and other objects of the invention will be apparent in view of the following detailed description of the invention, taken in conjunction with the attached drawings.

In the drawings:

Fig. 3 is a view, similar to Fig. 1, showing the coupling mechanism in a partially open or partially closed position;

Figure 1:
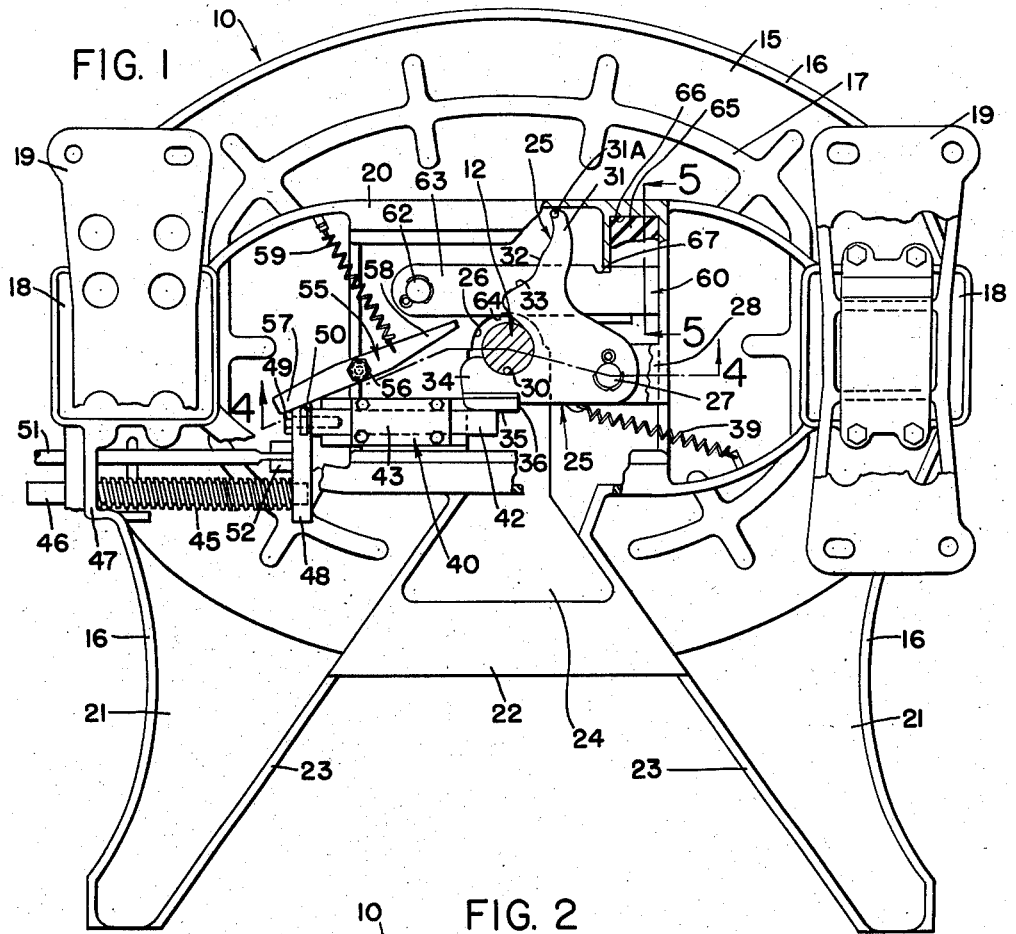
Fig. 1 is a bottom plan view of a fifth wheel embodying the invention and showing the coupling mechanism in the closed and locked position.

Fig. 4 is a fragmentary section taken substantially on line 4—4 of Fig. 1, inverted 180°, and directed toward the front portion of the fifth wheel; and Fig. 5 is a fragmentary section taken substantially on line 5—5 of Fig. 1, inverted 180°, and showing the member for absorbing the shock of coupling.

An improved fifth wheel according to the invention is indicated generally by the numeral 10 and is mounted in a conventional manner on the rear platform of a tractor (not shown). The fifth wheel includes a top plate having a conventional configuration with a rear opening formed by divergent leg portions and terminating in an elongated medial slot for receiving a vehicle king pin. The king pin, indicated generally by the numeral 12, is mounted in a conventional manner on the front underside of a trailer (not shown). The fifth wheel further includes a king pin holding arm pivotally secured beneath the top plate, a mechanism for locking the king pin holding arm in its closed position, a latch positively holding the locking mechanism in disengaged position so as to permit the holding arm to move to the fully open position, and a member for absorbing the shock of the king pin when the holding member is closed.

Referring to the drawings, the top plate 15 of the fifth wheel assembly is of conventional shape having a peripheral depending flange 16 and strengthening web 17. The top plate is secured to the rear platform of a tractor by a pair of depending bosses 18 pivotally connected to supporting brackets 19. Between the brackets 19, the underside of the top plate has a dependent, flanged underhousing 20 which protects and provides support for the several operating elements as described below. The rear portion of the top plate has rearwardly divergent leg portions 21, reinforced by a bottom web plate 22, the inner edges 23 of which define an opening 24 adapted to guide the king pin 12 into engagement with a king pin holding arm, indicated generally by the numeral 25.

The king pin holding arm 25 is pivotally mounted within the underhousing 20 so as to move under and across the rearward end of a king pin slot 26 communicating with the opening 24. As best shown in Fig. 4, the arm 25 pivots on a pin 27 extending from the top of the underhousing 20 through a bracket 28. Suitable washers 29 are provided so that the arm 25 may pivot freely at all times.

The arm 25 includes a notch 30 which receives the king pin 12 as it enters the slot 26. The arm 25 also includes a forwardly directed extension 31. At its extreme forward end the extension 31 is provided with a depending finger or pin 31A. Between the pin 31A and the notch 30, the extension has at least two distinct cam-like surfaces 32 and 33. The pin 31A and surfaces 32 and 33 act in cooperation with a locking mechanism and latch described in detail below. Rearwardly of notch 30, the main portion of the arm 25 is provided with an angled surface 34 and a locking surface 35 which also function in cooperation with the locking mechanism. In order to compensate for wear of the locking surface 35 and the plunger of the locking mechanism, and adjust for slack, the surface 35 is preferably provided with a removable wear block 36 held by a bolt 37. To adjust for wear, the block 36 may be shimmed as at 38, or may be removed and replaced by another block 36 having a larger thickness. A tension spring 39 is connected at one end to the underhousing 20 and at the other end to the holding arm 25, between the pin 27 and the rear surface 35, so as to cause the holding arm 25 to remain with its notch 30 in position to receive the king pin 12 when the fifth wheel assembly is uncoupled, all as described below.

The locking mechanism, indicated generally by the numeral 40, is located within the underhousing 20 on the side of slot 26 opposite of the holding arm pin 27. The locking mechanism 40 includes a transversely movable locking plunger 42, slidable in a bracket 43 attached to the underhousing 20, the plunger 42 being extensible under or across the rearward end of slot 26 into locking engagement with the holding arm 25 by the action of a strong compression spring 45 which is carried by a plunger actuating shaft 46. The outer end of the shaft 46 is journaled in the housing flange 16, as indicated at 47. The inner end of shaft 46 is connected to the rearward portion of a plunger link bar 48. The plunger 42 is fastened to the forward portion of the link bar 48 by a bolt 49. Extending downwardly from the forward portion of the bar 48 is a latch dog 50. A handle 51 is connected by a clevis 52 to the middle of the link bar 48 so that the plunger 42 may be retracted or withdrawn from engagement with the holding arm 25, as described below.

When the plunger 42 is retracted by movement of the handle 51, it is necessary that the plunger be rendered inoperative or held out of contact with the holding arm 25 until the trailer is completely uncoupled from the fifth wheel 10. Accordingly, a cooperative latch bar, indicated generally by the numeral 55, is rotatably mounted by a bolt 56 to the underhousing 20 (see Fig. 4). The outer end 57 of the latch 55 is squared so as to engage the latch dog 50 when the plunger 42 is retracted from contact with the holding arm 25. The inner end 58 of the latch 55 is preferably tapered so as to slidably engage the depending finger 31A of the holding arm extension, as described below. A tension spring 59 is connected at one end to the underhousing 20 and at the other end to the latch 55, between the bolt 56 and the end 58, so as to cause the end 57 of latch 55 to always be tending to rotate into engagement with the latch dog 50.

To absorb the shock or impact of coupling, the fifth wheel 10 incorporates therein a shock absorbing member indicated generally by the numeral 60. As best shown in Fig. 4, a pin 62, similar to pin 27 but shorter, depends from the top of the underhousing 20. The pin 62 pivotally supports one end of a horizontal, substantially rectangular shock bar 63. The rearward face 64 of the shock bar extends transversely across and in front of the extreme forward end of slot 26. Thus, when a king pin 12, after having been engaged in the slot 30 of the holding arm 25, is moved to the forward end of slot 26; before actual contact with the end of the slot, the king pin will strike the shock bar 63. The end of the bar opposite to pivot pin 62 is secured on its front side, as by cementing or other suitable means, to a resilient, rubber-like block 65 of neoprene or other suitable oil and grease resistant material.

As best shown in Fig. 5, the resilient block 65 is securely fitted within a pocket 66 on the front wall of the underhousing 20. Referring to Fig. 3, the shock bar 63 has a notch 67 on its forward edge so as to normally remain clear of contact with the side of pocket 66. The width of the block 65 is so chosen as to provide that the rearward face 64 of the shock bar across the slot 26 will extend longitudinally of the slot 26 a distance sufficient to materially reduce the impact of coupling, the shock of said impact being absorbed by the resilient block. It has been found that this distance may range from ⅛ to ½ inch with approximately a ¼ inch distance being preferred. However, the actual distance will depend upon the size of the fifth wheel 10, the size of the trailer king pin 12, and other load factors. In addition to materially reducing the shock of the coupling impact, it has also been found that together with the use of a wear block 36, that the shock bar 63 and rubber block 65 will compensate for wear of the plunger 42 and the surface 35 of the holding arm.

The operation of the fifth wheel 10 is as follows:

In Fig. 1, the fifth wheel is shown in the closed and locked (or coupled) condition. The king pin 12 is engaged by the holding arm 25 and is at the forward end of slot 26 in contact with the shock bar 63. The locking plunger 42 is contacting surface 35 of arm 25 so as to lock the holding arm closed.

Figure 2:
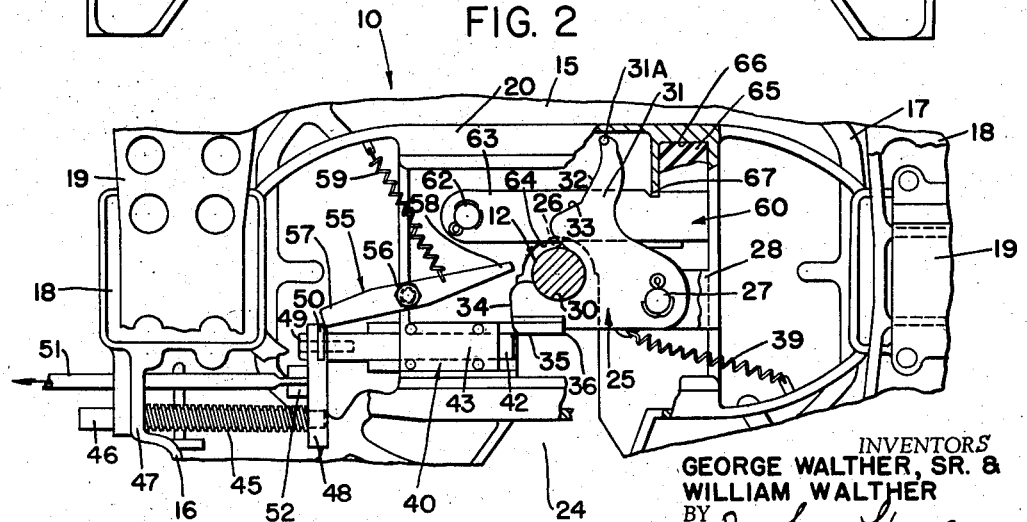
Fig. 2 is a fragmentary view, similar to Fig. 1, showing the coupling mechanism in an unlocked position, preparatory to uncoupling the trailer from the tractor.

Referring to Fig. 2, the uncoupling is begun by manually pulling shaft 51 outwardly (to the left in Fig. 1), against the action of spring 45. This retracts plunger 42 from locking contact with rear surface 35. When the plunger is fully retracted, the square end 57 of the latch 55 will engage the latch dog 50 and the plunger will be positively disengaged from contact with the holding arm. The tractor can then be pulled ahead and the holding arm will pivot on pin 27 to allow withdrawal of the king pin to uncoupled position.

Fig. 3 shows a condition of the fifth wheel which exists either just prior to complete uncoupling or else just after commencement of coupling. Assuming for the moment that the condition is just prior to complete uncoupling, that is, a condition successive to that shown in Fig. 2, the king pin 12 is about to move out of the slot 26. At this point, the finger 31A on the extension 31 of the holding arm will engage the end 58 of the latch 55, causing the latch end 57 to rotate clear of engagement with the latch dog 50 and free the plunger 42.

The plunger 42 will be biased by spring 45 toward its extended or locking position. However, the inner end of the plunger is contacting the surface 33 and aids further pivotal movement of the holding arm 25. As the holding arm pivots further open, in a counterclockwise direction as shown in Fig. 3, the plunger 42 will contact the surface 32. Thus, the plunger has become reset so as to permit automatic recoupling of the fifth wheel with spring 39 maintaining the holding arm in an open position.

To recouple, the king pin is entered into the opening 24 where it is guided, if necessary, by the side flanges 23 into slot 26. As the king pin enters slot 26 it will become engaged in the notch 30 of the holding arm. Fig. 3 shows the condition of the fifth wheel 10 just prior to such engagement of the king pin with the notch 30.

As the king pin and holding arm 25 move from the condition shown in Fig. 3 to that shown in Fig. 1, the plunger 42, which has been released by the finger 31A on the holding arm extension 31, will be forced inwardly by the compression spring 45. During the pivotal movement of the holding arm, the plunger 42, which was contacting surface 32 in the fully open condition of the fifth wheel, will contact in succession and move unimpeded over, surface 33, the king pin 12, surface 34, and finally the rear or locking surface 35.

An improved fifth wheel embodying the elements of the invention has been described herein a preferred form. However, changes and modifications could be made therein and these are intended to be included within the scope of the subjoined claims.

What is claimed is:

1. In a fifth wheel having a top plate with a rear opening formed by divergent leg portions and terminating in an elongated forwardly directed medial slot for receiving a vehicle king pin, the combination of, a metal bar extending across and slightly longitudinally into the forward end of said slot, said bar being pivotally mounted at one end to said top plate and the other end of said bar being affixed to a resilient cushioning member beneath said top plate, a pivotable king pin holding arm, a pivot mounting said arm beneath the top plate, a transversely movable spring loaded plunger mounted on the top plate for locking engagement with said arm, a surface on said arm engaging said plunger for locking the arm around said king pin when in contact with said bar and said plunger is extended, a pivotable latch, a pivot mounting said latch beneath the top plate, cooperating surfaces on said latch and said plunger for holding said plunger when retracted, means on said arm for releasing said plunger from a retracted position as said king pin moves away from said bar toward said opening, the king pin holding arm pivot and latch pivot being on opposite sides of said medial slot.

2. In a fifth wheel having a top plate with a rear opening formed by divergent leg portions and terminating in an elongated forwardly directed medial slot for receiving a vehicle king pin, the combination of, a metal bar extending across and slightly longitudinally into the forward end of said slot, said bar being pivotally mounted at one end to said top plate and the other end of said bar being affixed to a resilient cushioning member beneath said top plate, a pivotable king pin holding arm, a pivot mounting said arm beneath the top plate, a locking member mounted on the top plate having a forwardly directed surface engaging a rearwardly directed surface on said arm when said king pin is at the forward end of said slot, a pivotable latch, a pivot mounting said latch beneath the top plate, cooperating surfaces on said latch and said locking member for holding said locking member in a disengaged position with said arm, and an extension on said arm movable arcuately of said slot as the arm pivots toward said opening for releasing said latch and locking member cooperating surfaces, the king pin holding arm pivot being mounted on one side of said medial slot and the latch pivot and locking member being mounted on the opposite side of the medial slot.

References Cited in the file of this patent

UNITED STATES PATENTS

| | | |
|---|---|---|
| 2,015,313 | Kinne | Sept. 24, 1935 |
| 2,423,743 | Walther | July 8, 1947 |
| 2,610,069 | Ketel | Sept. 9, 1952 |